(12) United States Patent
Cobo et al.

(10) Patent No.: US 12,404,561 B2
(45) Date of Patent: *Sep. 2, 2025

(54) STEEL SHEET AND HIGH STRENGTH PRESS HARDENED STEEL PART AND METHOD OF MANUFACTURING THE SAME

(71) Applicant: ArcelorMittal, Luxembourg (LU)

(72) Inventors: Sebastian Cobo, Montigny-lès-Metz (FR); François Stouvenot, Maizieres les Metz (FR); Emmanuel Lucas, Maizieres les Metz (FR)

(73) Assignee: ArcelorMittal, Luxembourg (LU)

( * ) Notice: Subject to any disclaimer, the term of this patent is extended or adjusted under 35 U.S.C. 154(b) by 58 days.

This patent is subject to a terminal disclaimer.

(21) Appl. No.: 18/557,348

(22) PCT Filed: Apr. 29, 2022

(86) PCT No.: PCT/IB2022/053986
§ 371 (c)(1),
(2) Date: Oct. 26, 2023

(87) PCT Pub. No.: WO2022/234413
PCT Pub. Date: Nov. 10, 2022

(65) Prior Publication Data
US 2024/0218476 A1 Jul. 4, 2024

(30) Foreign Application Priority Data
May 4, 2021 (WO) .................. PCT/IB2021/053731

(51) Int. Cl.
*C21D 8/00* (2006.01)
*B32B 15/01* (2006.01)
(Continued)

(52) U.S. Cl.
CPC .............. *C21D 8/005* (2013.01); *B32B 15/01* (2013.01); *C21D 1/18* (2013.01); *C21D 6/004* (2013.01);
(Continued)

(58) Field of Classification Search
CPC .......... C21D 8/005; C21D 1/18; C21D 6/004; C21D 6/005; C21D 6/008;
(Continued)

(56) References Cited

U.S. PATENT DOCUMENTS

| 2016/0017452 A1 | 1/2016 | Puerta Velasquez et al. |
| 2017/0253941 A1* | 9/2017 | Cobo ..................... C21D 1/673 |

(Continued)

FOREIGN PATENT DOCUMENTS

| CN | 109972061 | 7/2019 |
| JP | 2007211276 A | 8/2007 |

(Continued)

OTHER PUBLICATIONS

International Search Report of PCT/IB2022/053986 dated Jun. 22, 2022.
(Continued)

*Primary Examiner* — Katherine A Christy
(74) *Attorney, Agent, or Firm* — Davidson Kappel LLC (57) ABSTRACT

A steel sheet made of a steel having a composition including, C: 0.3-0.4%, Mn: 0.5-1.0%, Si: 0.4-0.8%, Cr: 0.1-1.0%, Mo: 0.1-0.5%, Nb: 0.01-0.1%, Al: 0.01-0.1%, Ti: 0.008-0.03%, B: 0.0005-0.003%, P≤0.020%, Ca≤0.001%, S≤0.004%, N≤0.005% and including optionally Ni<0.5%, having a microstructure including, in surface fraction, from 60% to 95% of ferrite, the rest being martensite-austenite islands, pearlite or bainite, and including a bulk and a skin layer occupying the outermost 10% of the thickness on either sides of the bulk, the skin layer having a skin layer inclusion
(Continued)

population wherein the surface fraction of oxides is equal to or below $60*10^{-6}$.

5 Claims, 1 Drawing Sheet

(51) Int. Cl.
    *C21D 1/18*     (2006.01)
    *C21D 6/00*     (2006.01)
    *C21D 9/00*     (2006.01)
    *C22C 38/00*     (2006.01)
    *C22C 38/02*     (2006.01)
    *C22C 38/04*     (2006.01)
    *C22C 38/06*     (2006.01)
    *C22C 38/44*     (2006.01)
    *C22C 38/48*     (2006.01)
    *C22C 38/50*     (2006.01)
    *C22C 38/54*     (2006.01)

(52) U.S. Cl.
    CPC ............ *C21D 6/005* (2013.01); *C21D 6/008* (2013.01); *C21D 9/0068* (2013.01); *C22C 38/001* (2013.01); *C22C 38/002* (2013.01); *C22C 38/02* (2013.01); *C22C 38/04* (2013.01); *C22C 38/06* (2013.01); *C22C 38/44* (2013.01); *C22C 38/48* (2013.01); *C22C 38/50* (2013.01); *C22C 38/54* (2013.01); *C21D 2211/008* (2013.01)

(58) Field of Classification Search
    CPC . C21D 2211/008; B32B 15/01; C22C 38/001; C22C 38/002; C22C 38/02; C22C 38/04; C22C 38/06; C22C 38/44; C22C 38/48; C22C 38/50; C22C 38/54

USPC ........................................................ 428/639
See application file for complete search history.

(56) References Cited

U.S. PATENT DOCUMENTS

| | | |
|---|---|---|
| 2017/0298465 A1 | 10/2017 | Cobo et al. |
| 2019/0233927 A1 | 8/2019 | Hashimura et al. |
| 2020/0190621 A1 | 6/2020 | Cobo et al. |
| 2020/0255927 A1 | 8/2020 | Wang et al. |
| 2021/0332454 A1 | 10/2021 | Ono et al. |
| 2021/0340641 A1 | 11/2021 | Ono et al. |
| 2024/0218476 A1 | 7/2024 | Cobo et al. |

FOREIGN PATENT DOCUMENTS

| | | |
|---|---|---|
| JP | 2007314817 A | 12/2007 |
| JP | 2010043323 A | 2/2010 |
| JP | 2016504488 A | 2/2016 |
| JP | 2017525849 A | 9/2017 |
| JP | 2020522614 A | 7/2020 |
| JP | 2024517824 A | 4/2024 |
| WO | WO 2020045219 A1 | 3/2020 |
| WO | WO 2020045220 A1 | 3/2020 |
| WO | WO 2022234413 A1 | 11/2022 |
| WO | WO 2022234414 A1 | 11/2022 |

OTHER PUBLICATIONS

International Search Report of PCT/IB2022/053987 dated Jun. 22, 2022.

* cited by examiner

STEEL SHEET AND HIGH STRENGTH PRESS HARDENED STEEL PART AND METHOD OF MANUFACTURING THE SAME

The present invention relates to steel sheets and to high strength press hardened steel parts having good bendability properties.

BACKGROUND

High strength press-hardened parts can be used as structural elements in automotive vehicles for anti-intrusion or energy absorption functions.

In such type of applications, it is desirable to produce steel parts that combine high mechanical strength and high impact resistance. Moreover, one of the major challenges in the automotive industry is to decrease the weight of vehicles in order to improve their fuel efficiency in view of global environmental conservation, without neglecting safety requirements.

SUMMARY OF THE INVENTION

This weight reduction can be achieved in particular thanks to the use of steel parts with a predominantly martensitic microstructure.

It is challenging to produce very high strength steels which also have a good resistance to the formation of cracks under bending. Indeed, very high strength steels tend to crack early on when submitted to a bending load. This is detrimental to the crash worthiness of a part produced with such high strength steel, because even though the material is able to withstand very high loads thanks to its high tensile strength, once cracks start to appear in the part, these cracks will quickly propagate under the continued load and the part will fail prematurely.

A purpose of the current invention is to address the above-mentioned challenge and to provide a press hardened steel part having a combination of high mechanical properties with a tensile strength after hot stamping above or equal to 1800 MPa and a bending angle in the rolling direction normalized to 1.5 mm equal to or higher than 50° as measured by the VDA-238 standard.

Another purpose of the invention is to obtain a steel sheet that can be transformed by hot forming into such a press hardened steel part.

The present invention provides a steel sheet made of a steel having a composition comprising, by weight percent:

C: 0.3–0.4%

Mn: 0.5–10%

Si: 0.4–0.8%

Cr: 0.1–10%

Mo: 0.1–0.5%

Nb: 0.01–0.1%

Al: 0.01–0.1%

Ti: 0.008–0.03%

B: 0.0005–0.003%

P ≤ 0.020%

Ca ≤ 0.0010%

S ≤ 0.004%

N ≤ 0.005% and comprising optionally:

Ni < 0.5% the remainder of the composition being iron and unavoidable impurities resulting from the smelting, said steel sheet having a microstructure comprising, in surface fraction, from 60% to 95% of ferrite, the rest being martensite-austenite islands, pearlite or bainite, said steel sheet comprising from the bulk to the surface of the coated steel sheet:

a bulk such bulk being topped by a skin layer occupying the outermost 10% of the thickness on either side of the bulk, said skin layer having a skin layer inclusion population wherein the surface fraction of oxides is equal to or less than $60*10^{-6}$.

BRIEF DESCRIPTION OF THE DRAWINGS

The invention will now be described in detail and illustrated by examples without introducing limitations, and referring to the FIGURE, which is a schematic cross section of a steel sheet according to the invention.

DETAILED DESCRIPTION

A blank of steel refers to a flat sheet of steel, which has been cut to any shape suitable for its use. A blank has a top and bottom face, which are also referred to as a top and bottom side or as a top and bottom surface. The distance between said faces is designated as the thickness of the blank. The thickness can be measured for example using a micrometer, the spindle and anvil of which are placed on the top and bottom faces. In a similar way, the thickness can also be measured on a formed part.

Hot stamping is a forming technology which involves heating a blank up to a temperature at which the microstructure of the steel has at least partially transformed to austenite, forming the blank at high temperature by stamping it and quenching the formed part to obtain a microstructure having a very high strength. Hot stamping allows to obtain very high strength parts with complex shapes and presents many technical advantages. It should be understood that the thermal treatment to which a part is submitted includes not only the above described thermal cycle of the hot stamping process itself, but also possibly other subsequent heat treatment cycles such as for example the paint baking step, performed after the part has been painted in order to bake the paint. The mechanical properties of hot stamped parts below are those measured after the full thermal cycle, including optionally for example a paint baking step, in case paint baking has indeed been performed.

The ultimate tensile strength is measured according to ISO standard ISO 6892-1, published in October 2009. The tensile test specimens are cut-out from flat areas of the hot stamped part. If necessary, small size tensile test samples are taken to accommodate for the total available flat area on the part.

The bending angle is measured according to the VDA-238 bending standard. For the same material, the bending angle depends on the thickness. For the sake of simplicity, the bending angle values of the current invention refer to a thickness of 1.5 mm. If the thickness is different than 1.5 mm, the bending angle value needs to be normalized to 1.5 mm by the following calculation where $\alpha 1.5$ is the bending angle normalized at 1.5 mm, t is the thickness, and $\alpha t$ is the bending angle for thickness t:

$$\alpha 1.5 = (\alpha t \times \sqrt{t})/\sqrt{1.5}$$

In the current invention, the bending angle was measured in the rolling direction, i.e. the direction along which the steel sheet travelled during the hot-rolling step. The bending angle was measured using a laser measurement device. When performing bending tests on hot stamped part, the samples are cut-out from flat areas of the part. If necessary, small size samples are taken to accommodate for the total available flat area on the part. If the rolling direction on the hot stamped part is not known, it can be determined using Electron Back-Scattered Diffraction (EBSD) analysis across the section of the sample in a Scanning Electron Microscope (SEM). The rolling direction is determined according to the intensity of the Orientation Density Function (ODF) representative of the major fibers at $\varphi 2 = 45°$, where $\varphi 2$ is the Euler angle as defined in "H.-J. Bunge: Texture Analysis in Materials Science—Mathematical Methods. 1st English Edition by Butterworth Co (Publ.) 1982" (see FIGS. 2.2 and 2.3 for the definition of $\varphi 2$).

The bending angle of a part is representative of the ability of the part to resist deformation without the formation of cracks.

The composition of the steel according to the invention will now be described, the content being expressed in weight percent. The chemical compositions are given in terms of a lower and upper limit of the composition range, said limits being comprised within the possible composition range according to the invention.

According to the invention the carbon ranges from 0.3% to 0.4% to ensure a satisfactory strength. Above 0.4% of carbon, weldability and bendability of the steel sheet may be reduced. If the carbon content is lower than 0.3%, the tensile strength will not reach the targeted value.

The manganese content ranges from 0.5% to 1.0%. Above 1.0% of addition, the risk of MnS formation is increased to the detriment of the bendability. Below 0.5% the hardenability of the steel sheet is reduced.

The silicon content ranges from 0.4% to 0.8%. Silicon is an element participating in the hardening in solid solution. Silicon is added to limit carbides formation. Above 0.8%, silicon oxides form at the surface, which impairs the coatability of the steel. Moreover, the weldability of the steel sheet may be reduced.

The chromium content ranges from 0.1% to 1.0%. Chromium is an element participating in the hardening in solid solution and must be higher than 0.1% to ensure sufficient strength. The chromium content is preferably below 0.4% to limit processability issues and cost. Preferably the chromium content ranges from 0.1% to 0.4%.

Molybdenum content ranges from 0.1% to 0.5%. Molybdenum improves the hardenability of the steel. Below 0.1%, the tensile strength is not reached. Molybdenum is preferably not higher than 0.4% to limit costs.

Niobium ranges from 0.01% to 0.1%. Niobium improves ductility of the steel. Above 0.1% the risk of formation of NbC or Nb(C,N) carbides increases to the detriment of the bendability. Preferably the niobium content ranges from 0.03% to 0.06%.

According to the invention, the aluminium content ranges from 0.01% to 0.1% as it is a very effective element for deoxidizing the steel in the liquid phase during elaboration. Aluminium can protect boron if titanium content is not sufficient. The aluminium content is lower than 0.1% to avoid oxidation problems and ferrite formation during press hardening. Preferably the aluminium content ranges from 0.03% to 0.05%.

According to the invention, the titanium content ranges from 0.008% to 0.03% in order to protect boron, which would be trapped within BN precipitates. Titanium content is limited to 0.03% to avoid excess TiN formation. As will be explained in more detail further, it is possible to add the appropriate amount of Ti to capture the residual N content by measuring the N level of the liquid steel before adding Ti.

According to the invention, the boron content ranges from 0.0005% and 0.003%. Boron improves the hardenability of the steel. The boron content is not higher than 0.003% to avoid slab breaking issues during continuous casting.

Phosphorous is controlled to below 0.020%, because it leads to fragility and weldability issues.

Calcium is controlled to below 0.001% because the presence of Calcium in the liquid steel can lead to the formation of coarse precipitates which are detrimental to bendability.

Sulphur is controlled to below 0.004% because the presence of Sulphur in the liquid steel can lead to the formation of MnS precipitates which are detrimental to bendability.

Nitrogen is controlled to below 0.005% preferentially below 0.004% even more preferentially below 0.003%. The presence of Nitrogen can lead to the formation of precipitates such as TiN or TiNbCN, which are detrimental to the bendability.

Nickel is optionally added, up to a level of 0.5%. Nickel can be used to protect the steel from delayed cracking.

The remainder of the composition of the steel is iron and impurities resulting from the smelting.

The microstructure of the coated steel sheet according to the invention will now be described.

The steel sheet has a microstructure comprising, in surface fraction, from 60% to 95% of ferrite, the rest being martensite-austenite islands, pearlite or bainite.

The ferrite is formed during the intercritical annealing of the cold rolled steel sheet. The rest of the microstructure is austenite at the end of the soaking, which transforms into martensite-austenite islands, pearlite or bainite during the cooling of the steel sheet.

The total amount of ferrite in the steel sheet microstructure is a function of the chemical composition, the annealing temperature TA and the soaking time tA.

The highest the annealing temperature TA in the range of 700° C. to 850° C. and the longest the time time tA in the range of 10 seconds to 20 minutes, the more austenite will be formed during annealing. After annealing, the transformation of the formed austenite into martensite, bainite or ferrite will depend mainly on the cooling speed. Preferably, the cooling speed is below 10° C./s in order to form as much soft phases (ferrite, bainite) as possible This allows for good processability of the steel sheet before hot stamping.

Figure 1:
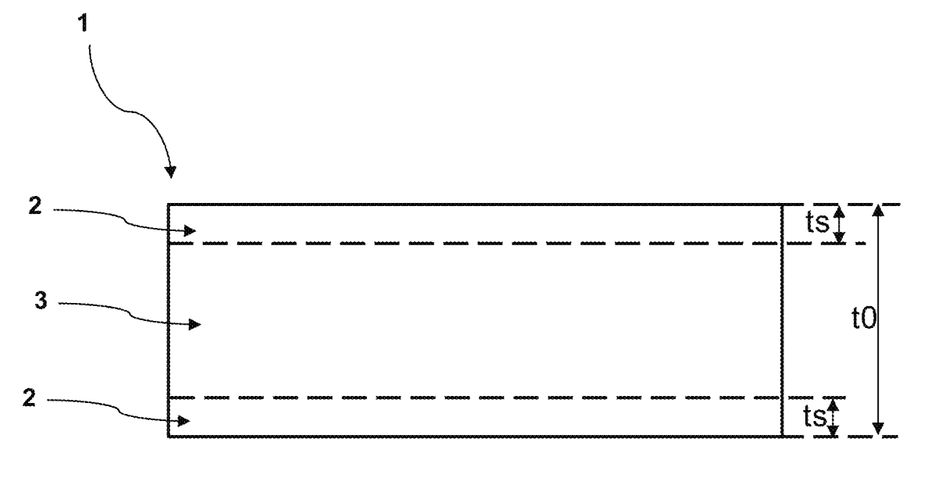

Referring to the FIGURE, the steel sheet 1 according to the invention comprises a bulk portion 3 and a top and bottom skin layer 2. The total thickness of the steel sheet 1 is t0 and the thickness ts of the skin layers 2 is such that ts=t0*10%. In other words the skin layers 2 occupy the outermost 10% of the thickness on either sides of the bulk.

Said skin layers 2 have a skin layer inclusion population wherein the surface fraction of oxides is equal to or less than $60*10^{-6}$. The method used to measure said inclusion population will be further detailed below.

The inventors have found that there is a correlation between the bending angle and the skin layer inclusion population, in particular the oxides population. By controlling said skin inclusion population it is possible to improve the bending angle without adversely affecting other product properties, such as for example the tensile strength.

The following is a description of the methodology that was used in order to characterize the inclusions in the steel sheet and steel parts. It should be understood that this is only one possible methodology and that other protocols can also be implemented.

The inclusions present in the steel sheet have been characterized using a Scanning Electron Microscope (SEM) with Field Effect Gun (FEG). A Tescan Mira 3 SEM was used at a 14 kV power setting. Furthermore, the inclusions were analyzed using Energy Dispersive Spectrometry (EDS). A 120 $mm^2$ Bruker EDS probe was used.

The sample is divided into 3 areas (Top skin, bottom skin, bulk, as described previously). Each area is divided into fields. In each field, inclusions are detected. A zoom is made on each inclusion to catch morphological features and perform EDS analysis. A double gray level threshold is set to catch particles (on a scale going from 0 to 255, 0 being black and 255 being white):
  classical dark particles, such as oxides, having grey level <150
  bright particles, such as NbC particles, with grey level >220

Using the information of the EDS probe, the shape and brightness level, each particle is then classified in one of the following categories: TiN, NbC, TiNbCN, alumina, Complex oxides, Oxisulfides, MnS.

The next step is to compute for the whole set of inclusions and for each particle family the following characteristics:
  average diameter in microns
  density in number of inclusions/$mm^2$
  surface fraction of inclusions, defined as the sum total on all analyzed fields of the surface area occupied by a given inclusion family divided by the total surface of all analyzed areas. The surface fraction of inclusions can be calculated using the following formula (here for a type of particle called "X"):

$$\text{Surface fraction of particle } X = \frac{\sum \text{surface area of all particles } X}{\text{analysed surface area}}$$

The surface faction of inclusions combines in one single parameter information both on the density level of particles and on their average size. The inventors have found that the surface fraction of inclusions is a good indicator of cleanliness and correlates well, in the case of specific inclusions, to some key in-use properties, such as the bending angle.

The coated steel sheet according to the invention can be produced by any appropriate manufacturing method and the person skilled in the art can define one. It is however preferred to use the method according to the invention comprising the below described steps.

In the following description, the term ladle refers to the vessel used to contain the liquid steel during the refining process. The term tundish refers to the container in which the liquid steel is poured before casting it into moulds—the tundish is used in continuous casting: it allows to have a buffer of liquid steel available for casting in between finishing pouring one ladle and opening the following ladle.

A semi-product able to be further hot-rolled, is provided with the steel composition described above. Particular care should be taken in the refining of said semi-product, in particular in the liquid phase and during casting, in order to manage the inclusion population.

In a first embodiment the liquid steel refining process comprises the following steps:
  after the pig iron has been decarburized at the converter by oxygen blowing, the liquid steel is tapped into a ladle without adding Al or any other deoxidizing element such as Si or Mn which would deoxidize the crude steel at this stage. This allows to minimize the subsequent nitrogen pick-up of the liquid steel.
  the main alloying elements, in particular Mn, Si, Cr, Mo, Nb and B, but not Ti, are incorporated in the liquid steel, under vacuum, for example using a Ruhrstahl Heraeus (RH) vacuum degassing system or a vacuum tank degasser (VTD). This allows, among other advantages, to ensure a low Nitrogen content.
  a desulfurization step is performed after said vacuum degassing step in order to reach the desired very low Sulfur levels. The desulfurization step involves exchanges between the liquid steel and a slag formed by adding fluxes to the heat, such as for example CaO based fluxes. These fluxes can be added before the desulfurization step, for example during tapping after the converter.
  Ti is added after the desulfurization step. Ti is added for example by using the measured Nitrogen composition in order to add just the right amount of Ti to precipitate N in the form of TiN in the semi-product. For example, the amount of added Ti, in weight percent, is equal to, or just above, 3.42 times the amount of Nitrogen measured after desulfurization.
  In order to minimize the amount of calcium aluminates, which can be detrimental to the bending performance of the press hardened part, no Ca containing additions (such as for example, SiCa, FeCa or pure Ca) are performed. Thanks to the very low S levels achieved using the targeted composition and process, the produced steel will contain a low MnS population.
  a minimum amount of time is provided to promote the flotation of inclusions. Inclusion flotation designates the phenomenon according to which the inclusions in the liquid steel, thanks to their lower density than steel, float up to the slag covering the liquid steel. Once the inclusions are trapped in the slag, they are removed from the liquid steel and will not be cast into the semi-product, thereby lowering the inclusion population. The inventors have found that said inclusion flotation time is correlated to the surface fraction of oxides in the skin layers of the steel sheet. The determination of said inclusion flotation time depends on the specific process route and equipment used to manufacture the steel. For example, in the above described case in which Mn, Si, Cr, Mo, Nb and B additions are made using a vacuum degasser and the liquid steel is further desulfurized after the vacuum degasser, the inclusion flotation time is the sum of:
    the time spent in the vacuum degasser after adding Mn, Si, Cr, Mo, Nb and B (the time is measured after the alloying elements are added because the addition of said elements can itself nucleate inclusion particles which will need to float to the slag), the time spent in the desulfurization step, the holding time in between the desulfurization step and the continuous casting operation itself. Said holding can include soft stirring using a controlled inert gas injection after desulfurization, ladle transportation steps in between the desulfurization station and the continuous casting operation, waiting time at the continuous casting step, etc. The continuous casting step starts when the ladle is opened to start pouring in the casting tundish.

In a second embodiment the liquid steel refining process comprises the following steps:

after the pig iron has been decarburized at the converter by oxygen blowing, the liquid steel is tapped into a ladle. Optionally, at this stage part of the alloying elements can be added, such as for example at least part of the Mo, Cr and Mn content of the steel can be added, a desulfurization step is then performed in order to reach the desired very low Sulfur levels. The desulfurization step involves exchanges between the liquid steel and a slag formed by adding fluxes to the heat, such as for example CaO based fluxes. These fluxes can be added before the desulfurization step, for example during tapping after the converter.

the main alloying elements, in particular Mn, Si, Cr, Mo, Nb and B, but not Ti at this stage, are incorporated in the liquid steel, under vacuum, for example using an RH vacuum degassing system or a VTD. After adding the main alloying elements, the steel is stirred under vacuum, this is known as the stirring step. For example, when using an RH vacuum degassing system, stirring is naturally induced in the system by the circulation of the liquid steel within the snorkels of the vacuum vessel. When using a VTD, stirring can be induced for example by bubbling Argon inside the liquid steel. This stirring step plays both the role of distributing evenly the alloying elements within the liquid steel and of promoting the flotation of inclusions.

Ti is added at the end of the vacuum degassing process. For example, the amount of added Ti is added using the measured Nitrogen composition in order to add just the right amount of Ti to precipitate N in the form of TiN in the semi-product. For example, the amount of Ti added, in weight percent, is equal to, or just above, 3.42 times the amount of Nitrogen measured at the end of the stirring step.

In order to minimize the amount of calcium aluminates, which can be detrimental to the bending performance of the press hardened part, no Ca containing additions (such as for example, SiCa, FeCa or pure Ca) are performed. Thanks to the very low S levels achieved using the targeted composition and process, the produced steel will contain a low MnS population. The inventors have found that with such low MnS content, bending performance was very good even without Ca addition to globularize the MnS population.

As in the first embodiment, a minimum amount of time is provided to promote the flotation of inclusions. In this second embodiment, in which the liquid steel is desulfurized before adding the main alloying elements under vacuum, the inclusion flotation time is the sum of:

the time spent in the vacuum degasser after adding Mn, Si, Cr, Mo, Nb and B, the holding time in between the vacuum degasser and the continuous casting operation itself. Said holding can include ladle transportation steps in between the vacuum degasser and the continuous casting operation, waiting time at the continuous casting step, etc. The continuous casting step starts when the ladle is opened to start pouring in the casting tundish.

More generally, it is preferable to refine the steel by performing the main additions of Mn, Si, Cr, Mo, Nb and B under vacuum, using for example a vacuum degasser. This allows for low nitrogen content in the steel and in turn allows for better control of nitrogen containing inclusions in the steel.

More generally, the inclusion flotation time is defined as the total amount of time the liquid steel spends after Mn, Cr, Si, Mo, Nb and B are added and before the casting step starts.

In order to control the inclusion surface fraction in the skin of the steel sheet, the inclusion flotation time should be controlled above a minimum inclusion flotation time tf. The value of tf will depend on the specific industrial setup which is used to produce the steel. It will depend on the production route in the steel shop as well as on the geometric configuration of the ladles that are used to process the liquid steel. Because the inclusion flotation time is related to fluid dynamics and movement of small particles within the liquid steel, the minimum inclusion flotation time necessary to reach the desired level of specific inclusions in the skin of the steel will depend on the size of the ladles, their diameter, height, volume etc. For example, the minimum inclusion flotation time is 60 minutes. For example, the minimum inclusion flotation time is 53 minutes.

In order to determine the minimum inclusion flotation time tf for a given steel composition and a given industrial equipment and production route, it is recommended to apply the following method:

Several heats (heatings) are performed using the same chemical composition targets Said heats are produced using different inclusion flotation times. For example a set of heats is performed using inclusion flotation times ranging from a minimum inclusion flotation time which corresponds to the minimum feasible inclusion flotation time of the industrial route, then incrementally longer inclusion flotation times are applied, for example using time increments of 10 minutes. For example five different inclusion flotation times are applied to five different heats.

Said heats are processed according to the below described industrial route and inclusion population of the steels are characterized using the above described method.

The skin layer oxides surface fraction and the respective inclusion flotation times are recorded. The inventors have found that there is a correlation between said skin layer oxides surface fraction and said inclusion flotation time. The longer the inclusion flotation time, the lower the skin layer oxides surface fraction. The minimum inclusion flotation time tf is determined as being the inclusion flotation time above which the skin layer oxides surface fraction is equal to or below $60*10^{-6}$. For example, the inventors have found that when using a specific industrial equipment that was available to the inventors and applying the processing route of the first embodiment, the minimum inclusion flotation time was 60 minutes, preferentially 53 minutes. This will be illustrated in the examples below.

After the liquid steel refining step, the method for manufacturing the steel sheet according to the present invention preferably comprises the following steps:

continuous casting of the liquid steel into a semi-product suitable to be hot-rolled. During the casting step particular care should be taken to avoid oxygen pick-up and therefore higher oxides level in the semi-product. For example, in the case of a continuous casting process in which the semi-products are slabs produced in a continuous sequence by casting in a mould the product of multiple heats poured into a tundish, specific refractories and linings can be used in the tundish, specific allocation rules can be used for first of sequence slabs and transient slabs between two different heats, etc.

The semi product is then optionally reheated at a temperature comprised from 1150° C. to 1300° C.

The steel sheet is then hot rolled at a finish hot rolling temperature comprised from 800° C. to 950° C.

The hot-rolled steel is then cooled and coiled at a temperature $T_{coil}$ lower than 670° C., and optionally pickled to remove oxidation.

The coiled steel sheet is then optionally cold rolled to obtain a cold rolled steel sheet. The cold-rolling reduction ratio preferably ranges from 20% to 80%. Below 20%, the recrystallization during subsequent heat-treatment is not favored, which may impair the ductility of the steel sheet. Above 80%, there is a risk of edge cracking during cold-rolling.

In an embodiment of the invention the annealed steel sheet is heated to an annealing temperature TA comprised from 700° C. to 850° C. and maintained at said temperature TA for a holding time tA comprised from 10 seconds to 20 minutes.

In an embodiment of the invention, said annealed steel sheet is cooled to a temperature range from 400° C. to 700° C. and further coated with a metallic coating.

In summary, the above described process comprises preferably the following successive steps:

Producing a liquid steel having the above described chemical composition, wherein during the liquid steel refining phase Mn, Si, Cr, Mo, Nb and B are added using a vacuum degasser and wherein a minimum inclusion flotation time tf is ensured, said inclusion flotation time being the total amount of time the liquid steel spends after adding Mn, Si, Cr, Mo, Nb and B and before the casting step starts, and said minimum inclusion flotation time tf being defined as the minimum inclusion flotation time necessary to reach a skin layer oxide surface fraction equal to or below $60*10^{-6}$, casting said liquid steel to obtain a semi-product able to be hot-rolled, optionally reheating the semi-product at a temperature $T_{reheat}$ comprised from 1100° C. to 1300° C., hot rolling the semi-product at a finish hot rolling temperature comprised from 800° C. to 950° C.

coiling the hot rolled steel sheet at a coiling temperature $T_{coil}$ lower than 670° C. to obtain a coiled steel sheet, optionally pickling the coiled steel sheet, optionally cold rolling the coiled steel sheet to obtain a cold rolled steel sheet optionally heating the hot rolled steel sheet or the cold rolled steel sheet to an annealing temperature $T_A$ comprised from 700° C. to 850° C. and maintaining the steel sheet at said temperature $T_A$ for a holding time $t_A$ comprised from 10 seconds to 20 minutes, to obtain an annealed steel sheet, optionally cooling said annealed steel sheet to a temperature range from 400° C. to 700° C., optionally coating the annealed steel sheet with a metallic coating optionally cooling the coated steel sheet to room temperature.

The press part manufacturing process and ensuing pressed part characteristics will now be detailed.

A steel blank is cut out of the steel sheet according to the invention and heated in an annealing furnace. Preferably, the steel blank is heated to a temperature comprised from 880° C. to 950° C. during 10 seconds to 15 minutes to obtain a heated steel blank. The heated blank is then transferred to a forming press before being hot formed and die-quenched to obtain a pressed part.

The microstructure of the pressed part comprises in surface fraction, more than 95% of martensite and less than 5% of bainite+ferrite. Furthermore, the pressed part according to the invention comprises a bulk portion and a top and bottom skin layer, wherein the skin layers occupy the outermost 10% of the thickness on either side of the bulk. Said skin layers have a skin layer inclusion population wherein the surface fraction of oxides is equal to or less than $60*10^{-6}$.

The pressed part according to the invention has a bending angle in the rolling direction normalised to 1.5 mm of at least 50° and a tensile strength TS of at least 1800 MPa. Such high tensile strength and bending angle confer to said part a very good mechanical resistance, especially in the case of a crash. They afford a very good energy absorption capacity and anti-intrusion capacity, thereby increasing the safety of the vehicle.

The invention will be now illustrated by the following examples, which are by no way limitative.

8 different samples were tested coming from 8 different heats A, B, C, D, E, F, G, H of steel produced using an industrial production route. Samples 11, 12, 13, 14, 15 and 16 are according to the invention, samples R1, R2 are reference samples.

The tested compositions are gathered in the following table wherein the element contents are expressed in weight percent:

TABLE 1

| | Sample composition | | | | | | | |
|---|---|---|---|---|---|---|---|---|
| Steel reference | A | B | C | D | E | F | G | H |
| C | 0.4 | 0.4 | 0.3 | 0.4 | 0.4 | 0.3 | 0.4 | 0.4 |
| Mn | 0.6 | 0.7 | 0.6 | 0.6 | 0.7 | 0.6 | 0.8 | 0.8 |
| Si | 0.5 | 0.5 | 0.5 | 0.6 | 0.5 | 0.5 | 0.6 | 0.5 |
| Cr | 0.3 | 0.3 | 0.3 | 0.3 | 0.3 | 0.3 | 0.2 | 0.2 |
| Mo | 0.2 | 0.2 | 0.2 | 0.2 | 0.2 | 0.2 | 0.2 | 0.2 |
| Nb | 0.06 | 0.05 | 0.05 | 0.05 | 0.05 | 0.05 | 0.05 | 0.04 |
| Al | 0.03 | 0.03 | 0.05 | 0.04 | 0.03 | 0.04 | 0.05 | 0.03 |
| Ti | 0.013 | 0.009 | 0.010 | 0.011 | 0.009 | 0.012 | 0.013 | 0.014 |
| B | 0.0016 | 0.0018 | 0.0022 | 0.0020 | 0.0017 | 0.0016 | 0.0020 | 0.0018 |
| P | 0.012 | 0.012 | 0.011 | 0.011 | 0.012 | 0.011 | 0.009 | 0.012 |
| Ca | 0.0003 | <0.0003 | 0.0004 | 0.0003 | <0.0003 | <0.0003 | <0.0003 | <0.0003 |
| S | 0.004 | 0.002 | 0.001 | 0.001 | 0.003 | 0.002 | 0.002 | 0.002 |
| N | 0.002 | 0.004 | 0.003 | 0.003 | 0.003 | 0.003 | 0.004 | 0.003 |
| Ni | 0.4 | 0.4 | 0.4 | 0.4 | 0.4 | 0.02 | 0.01 | 0.01 |

The following process parameters were applied in the steel shop and the following skin layer inclusions surface fraction was observed—the underlined values are not according to the invention:

TABLE 2

| | | Sample reference | | | | | | | |
|---|---|---|---|---|---|---|---|---|---|
| | | I1 | I2 | I3 | I4 | I5 | I6 | R1 | R2 |
| | | Steel reference | | | | | | | |
| | | A | B | C | F | G | H | D | E |
| Steel shop process times (minutes) | RH* | 5 | 10 | 2 | 2 | 5 | 4 | 2 | 2 |
| | DS** | 18 | 18 | 15 | 18 | 32 | 104 | 18 | 16 |
| | CC*** | 46 | 36 | 41 | 33 | 18 | 22 | 24 | 32 |
| | Inclusion flotation time = RH + DS + CC | 69 | 64 | 60 | <u>53</u> | <u>55</u> | 130 | <u>44</u> | <u>50</u> |
| Skin layer Inclusions Surface fraction (*10⁻⁶) | NbC particles | 33 | 185 | 204 | 79 | 100 | 81 | 110 | 198 |
| | Oxides particles | 31 | 38 | 56 | <u>47</u> | <u>38</u> | <u>26</u> | <u>70</u> | <u>65</u> |
| | MnS particles | 27 | 18 | 14 | <u>12</u> | <u>24</u> | <u>9</u> | <u>11</u> | <u>15</u> |
| | TiNbCN particles | 1 | 0 | 0 | 0 | 0 | 0 | 0 | 0 |
| | Oxides + MnS + TiNbCN | 59 | 56 | 70 | 59 | 62 | 35 | 81 | 80 |

*RH = RH Vacuum degasser process time after adding Mn, Si and Cr
**DS = Desulfurization process time
***CC = Time spent between the end of desulfurization and the start of continuous casting (=ladle opening to pour in the casting tundish).

The following process parameters were applied along the production route:

TABLE 3

| | further process conditions | | | | | | | |
|---|---|---|---|---|---|---|---|---|
| | I1 | I2 | I3 | I4 | I5 | I6 | R1 | R2 |
| Slab reheating temperature (° C.) | 1220 | 1244 | 1244 | 1206 | 1238 | 1243 | 1253 | 1233 |
| rolling temperature (° C.) | 914 | 902 | 913 | 911 | 908 | 892 | 911 | 900 |
| coiling temperature $T_{coil}$ (° C.) | 537 | 532 | 525 | 527 | 537 | 535 | 526 | 526 |
| Steel sheet annealing temperature (° C.) | 745 | 748 | 738 | 780 | 773 | 778 | 741 | 751 |
| Steel sheet annealing time (minutes) | 9 | 3 | 5 | 18 | 14 | 20 | 6 | 11 |
| hot forming annealing temperature (° C.) | 900 | 900 | 900 | 900 | 900 | 900 | 900 | 900 |
| hot forming annealing time (minutes) | 6 | 6 | 6 | 7 | 7 | 7 | 6 | 6 |

The following microstructures, bending angles and tensile strength were measured on the samples, the underlined values are not according to the invention:

TABLE 4 microstructure, bending angles and tensile strength

|  |  | I1 | I2 | I3 | I4 | I5 | I6 | R1 | R2 |
|---|---|---|---|---|---|---|---|---|---|
| Steel sheet | thickness (mm) | 1.0 | 1.6 | 1.2 | 1.5 | 2.0 | 1.5 | 1.7 | 1.3 |
|  | Ferrite content | 88% | 86% | 93% | 96% | 89% | 92% | 91% | 90% |
|  | Martensite + austenite + pearlite + bainite | 12% | 14% | 7% | 5% | 11% | 8% | 9% | 10% |
| Pressed part | Tensile Strength (MPa) | 1914 | 2025 | 1850 | 1801 | 1959 | 1954 | 1921 | 1998 |
|  | measured bending angle in the rolling direction (°) | 63 | 49 | 57 | 59 | 49 | 60 | 46 | 48 |
|  | bending angle normalized to 1.5 mm in the rolling direction (°) | 52 | 51 | 52 | <u>59</u> | <u>57</u> | <u>60</u> | <u>49</u> | <u>45</u> |
|  | Martensite content | 100% | 100% | 100% | 100% | 100% | 100% | 100% | 100% |

Table 4 shows that the samples according to the invention (references I1, I2, I3, I4, I5 and I6) have a tensile strength above 1800 MPa and a bending angle in the rolling direction normalized to 1.5 mm above 50° thanks to their specific composition and skin layer inclusions.

Referring to table 2, there is a relationship between the inclusion flotation time and the skin layer oxides surface fraction. the inclusion flotation time represents the total amount of time the liquid steel spends after adding Mn, Cr, Si, Mo, Nb and B and before the continuous casting step starts.

The inventors have found that when using the specific composition of the invention and when increasing the inclusion flotation time above a minimum inclusion flotation time tf, it is possible to control the skin layer oxides fraction below a critical level which ensures good bending resistance. In the industrial configuration that was used to produce the samples given in the current examples, the minimum inclusion flotation time tf is 53 minutes. The value of tf will depend on the specific industrial setup which is used to produce the steel.

When the inclusion flotation time is equal to or above tf=60 minutes the skin layer oxides surface fraction is equal to or below $60*10^{-6}$. When the inclusion flotation time is less than tf=53 minutes the skin layer oxides surface fraction is above $60*10^{-6}$.

The inventors have found that when the steel is submitted to a bending load, the inclusion surface fraction in the skin layers plays an important role in improving the resistance of the material to crack formation. Surprisingly, this is not the case for all types of inclusions. For example, NbC inclusions do not seem to have a significant impact on the bending properties of the steel. On the other hand, it was found that oxides surface fraction plays an important role in the bending performance. Reducing the oxides surface fraction helps to improve the bending performance.

Referring to table 4, the samples according to the invention (I1, I2, I3, I4, I5 and I6), which all have a skin layer oxides surface fraction equal to or below $60*10^{-6}$, all have a bending angle in the rolling direction normalized to 1.5 mm of at least 50° and also a tensile strength of at least 1800 MPa. On the other hand, the reference samples (R1, R2), while maintaining tensile strength above 1800 MPa all have a bending angle in the rolling direction normalized to 1.5 mm below 50°. Therefore, the steel produced according to the invention will exhibit better resistance to crack formation when submitted to a load while exhibiting a very high tensile strength, which will improve the crash-worthiness and the safety of the part produced using said material.

What is claimed is:

1. A steel sheet made of a steel having a composition comprising, by weight percent:

C: 0.3–0.4%

Mn: 0.5–10%

Si: 0.4–0.8%

Cr: 0.1–0.4%

Mo: 0.1–0.5%

Nb: 0.01–0.1%

Al: 0.01–0.1%

Ti: 0.008–0.03%

B: 0.0005–0.003%

P ≤ 0.020%

Ca ≤ 0.001%

S ≤ 0.004%

N ≤ 0.005% and comprising optionally:

Ni < 0.5% a remainder of the composition being iron and unavoidable impurities resulting from processing;

the steel sheet having a microstructure comprising, in surface fraction, from 60% to 95% of ferrite, a rest being martensite-austenite islands, pearlite or bainite, the steel sheet comprising from a bulk to the surface of the coated steel sheet:

the bulk, the bulk being topped by a skin layer occupying an outermost 10% of the thickness on either side of the bulk, the skin layer having a skin layer inclusion population wherein a surface fraction of oxides is equal to or less than $60*10^{-6}$.

2. The steel sheet as recited in claim 1, further comprising a metallic coating on at least one side of the steel sheet.

3. A press hardened steel part, the steel part having a composition comprising, by weight percent:

C: 0.3–0.4%

Mn: 0.5–10%

Si: 0.4–0.8%

Cr: 0.1–10%

Mo: 0.1–0.5%

Nb: 0.01–0.1%

Al: 0.01–0.1%

Ti: 0.008–0.03%

B: 0.0005–0.003%

P ≤ 0.020%

Ca ≤ 0.0010%

S ≤ 0.004%

N ≤ 0.005% and comprising optionally:

Ni < 0.5% a remainder of the composition being iron and unavoidable impurities resulting from processing, the steel part having a microstructure comprising, in surface fraction, more than 95% of martensite and up to 5% of bainite or ferrite;

the steel part comprising from a bulk to the surface of the steel part:

the bulk, the bulk being topped by a skin layer occupying the outermost 10% of a thickness on either side of the bulk, the skin layer having a skin layer inclusion population wherein the surface fraction of oxides is equal to or less than $60*10^{-6}$.

4. The press hardened steel part as recited in claim 3, wherein the press hardened steel part has a tensile strength TS of at least 1800 MPa and a bending angle in the rolling direction normalized to 1.5 mm of at least 50°.

5. A process for manufacturing a press hardened steel part, the process comprising the following successive steps:

providing the steel sheet as recited in claim 1;

cutting the steel sheet to a predetermined shape, so as to obtain a steel blank;

heating the steel blank to a temperature from 880° C. to 950° C. for 10 seconds to 15 minutes to obtain a heated steel blank;

transferring the heated blank to a forming press;

hot-forming the heated blank in the forming press to obtain a formed part; and die-quenching the formed part.

\* \* \* \* \*